(12) United States Patent
Takano et al.

(10) Patent No.: US 11,114,665 B2
(45) Date of Patent: Sep. 7, 2021

(54) ENERGY STORAGE DEVICE AND METHOD FOR PRODUCING SAME

(71) Applicant: GS Yuasa International Ltd., Kyoto (JP)

(72) Inventors: Masashi Takano, Kyoto (JP); Akihiko Miyazaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 82 days.

(21) Appl. No.: 16/328,184

(22) PCT Filed: Aug. 28, 2017

(86) PCT No.: PCT/JP2017/030672
§ 371 (c)(1),
(2) Date: Feb. 25, 2019

(87) PCT Pub. No.: WO2018/043375
PCT Pub. Date: Mar. 8, 2018

(65) Prior Publication Data
US 2019/0237764 A1 Aug. 1, 2019

(30) Foreign Application Priority Data
Aug. 29, 2016 (JP) .............................. JP2016-166825

(51) Int. Cl.
*H01M 4/587* (2010.01)
*H01G 11/26* (2013.01)
(Continued)

(52) U.S. Cl.
CPC ............ *H01M 4/587* (2013.01); *H01G 11/24* (2013.01); *H01G 11/26* (2013.01); *H01G 11/32* (2013.01);
(Continued)

(58) Field of Classification Search
None
See application file for complete search history.

(56) References Cited

U.S. PATENT DOCUMENTS

2009/0176079 A1 7/2009 Cabrera-Perez et al.
2009/0176151 A1 7/2009 Kim
(Continued)

FOREIGN PATENT DOCUMENTS

JP    H10241656 A    9/1998
JP    2000203818 A    7/2000
(Continued)

OTHER PUBLICATIONS

Kurzweil, Lithium Battery Energy Storage: State of the Art Including Lithium-Air and Lithium-Sulfur Systems, Nov. 2014, Electrochemical Energy Storage for Renewable Sources and Grid Balancing, chapter 16, 269-307 (Year: 2015).*
(Continued)

*Primary Examiner* — Daniel S Gatewood
(74) *Attorney, Agent, or Firm* — Rankin, Hill & Clark LLP

(57) ABSTRACT

There is provided is an energy storage device having improved power performance at a relatively large current. In the present embodiment, an energy storage device is provided, which has a negative active material layer containing particulate amorphous carbon, wherein a distribution curve of differential pore volume in the negative active material layer has a peak appearing within the range from 0.1 μm to 2 μm inclusive and the differential pore volume at the peak is 0.9 cm$^3$/g or more.

3 Claims, 6 Drawing Sheets

(51) Int. Cl.
   *H01G 11/38*     (2013.01)
   *H01G 11/24*     (2013.01)
   *H01G 11/32*     (2013.01)
   *H01G 11/86*     (2013.01)
   *H01M 4/04*      (2006.01)
   *H01M 10/0525*   (2010.01)
   *H01M 4/02*      (2006.01)

(52) U.S. Cl.
   CPC ............ *H01G 11/38* (2013.01); *H01G 11/86* (2013.01); *H01M 4/0404* (2013.01); *H01M 10/0525* (2013.01); *C01P 2002/02* (2013.01); *C01P 2006/14* (2013.01); *C01P 2006/17* (2013.01); *C01P 2006/40* (2013.01); *H01M 2004/021* (2013.01); *H01M 2004/027* (2013.01)

(56) References Cited

U.S. PATENT DOCUMENTS

| | | |
|---|---|---|
| 2012/0052393 A1 | 3/2012 | Kameda et al. |
| 2012/0183859 A1 | 7/2012 | Sasaki et al. |
| 2012/0295157 A1 | 11/2012 | Nagai et al. |
| 2013/0183580 A1* | 7/2013 | Kako ................. H01M 10/056 429/206 |
| 2013/0260217 A1 | 10/2013 | Matsui et al. |
| 2014/0294981 A1 | 10/2014 | Fichtner et al. |
| 2016/0301073 A1 | 10/2016 | Yoshikawa et al. |
| 2017/0110728 A1 | 4/2017 | Kobayashi et al. |
| 2017/0110729 A1 | 4/2017 | Tsuchiya et al. |
| 2017/0170478 A1 | 6/2017 | Mihara et al. |
| 2017/0187041 A1 | 6/2017 | Yamada et al. |

FOREIGN PATENT DOCUMENTS

| | | |
|---|---|---|
| JP | 2006059690 A | 3/2006 |
| JP | 2009004139 A | 1/2009 |
| JP | 2009032575 A | 2/2009 |
| JP | 2012164638 A | 8/2012 |
| JP | 5060289 | 10/2012 |
| JP | 5191483 | 5/2013 |
| JP | 2013138096 A | 7/2013 |
| JP | 5311157 | 10/2013 |
| JP | 2014089887 A | 5/2014 |
| JP | 2015141772 A | 8/2015 |
| JP | 5943052 B2 | 6/2016 |
| JP | 2016143448 A | 8/2016 |
| JP | 2016152153 A | 8/2016 |
| JP | 2016152153 A * | 8/2016 |
| JP | 2017050184 A | 3/2017 |
| WO | 2011089701 A1 | 7/2011 |
| WO | 2011089702 A1 | 7/2011 |
| WO | 2015083330 A1 | 6/2015 |
| WO | 2015141853 A1 | 9/2015 |
| WO | 2015147012 A1 | 10/2015 |
| WO | 2016009938 A1 | 1/2016 |
| WO | 2017122759 A1 | 7/2017 |

OTHER PUBLICATIONS

Extended European Search Report (EESR) dated Jul. 4, 2019 issued in the corresponding European patent application No. 17846380.8.
International Search Report (ISR) dated Oct. 31, 2017 filed in PCT/JP2017/030672.

* cited by examiner

ENERGY STORAGE DEVICE AND METHOD FOR PRODUCING SAME

TECHNICAL FIELD

The present invention relates to an energy storage device such as a lithium ion secondary battery.

BACKGROUND ART

Heretofore, a lithium ion secondary battery provided with a negative electrode containing a graphite powder as a negative active material is known (see, for example, Patent Document 1).

In the battery disclosed in Patent Document 1, when the particle sizes of the graphite powder that serves as a negative active material at a cumulative volume of 10% and a cumulative volume of 50% are defined as D10 and D50, respectively, the particle size ratio D10/D50 falls within the range from 0.1 to 0.52, D10 falls within the range from 1.2 to 9.2 μm, D50 falls within the range from 10 to 18.5 μm, and the specific surface area of the powder falls within the range from 3.0 to 6.5 m$^2$/g.

In the battery disclosed in Patent Document 1, the power performance at a relatively large current is not always sufficient. Therefore, an energy storage device having improved power performance at a relatively large current has been demanded.

PRIOR ART DOCUMENT

Patent Document

Patent Document 1: JP-A-2014-089887

SUMMARY OF THE INVENTION

Problems to be Solved by the Invention

One embodiment addresses the problem of providing an energy storage device having improved power performance at a relatively large current.

Means for Solving the Problems

An energy storage device according to an embodiment has a negative active material layer containing particulate amorphous carbon, wherein a distribution curve of differential pore volume in the negative active material layer has a peak appearing within a range from 0.1 μm to 2 μm inclusive and the differential pore volume at the peak is 0.9 cm$^3$/g or more. According to this configuration, the power performance at a relatively large current can be improved.

Advantages of the Invention

According to the embodiment, an energy storage device having improved power performance at a relatively large current can be provided.

MODE FOR CARRYING OUT THE INVENTION

Figure 1:
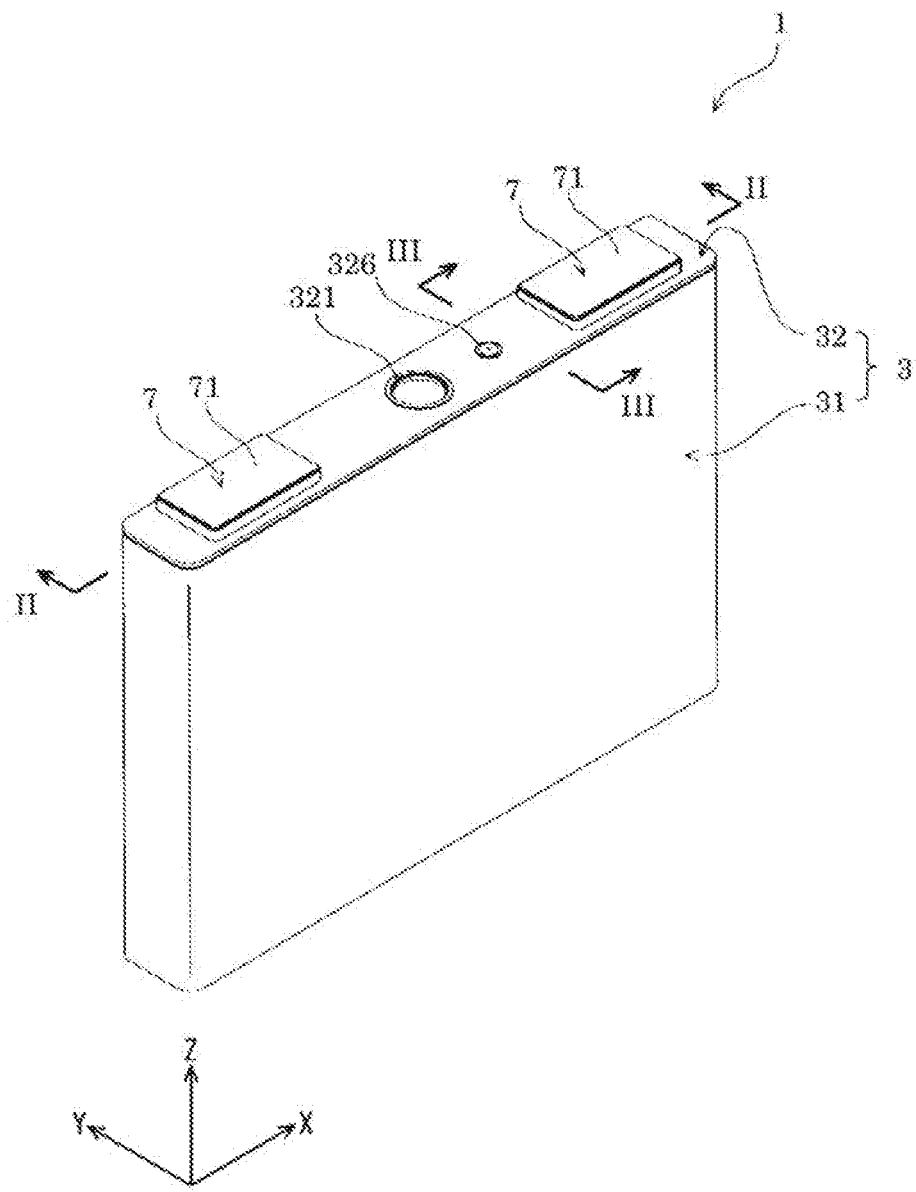
FIG. 1 is a perspective view of an energy storage device according to the present embodiment.

Hereinbelow, one embodiment of the energy storage device according to the present invention will be described with reference to FIG. 1 to FIG. 5. The energy storage device includes a primary battery, a secondary battery, a capacitor and the like. In the present embodiment, as one example of the energy storage device, a chargeable-dischargeable secondary battery will be described. In the present embodiment, the names of assembly members (assembly elements) are used only for the description of the present embodiment, and are sometimes different from those used in the section "BACKGROUND ART".

The energy storage device 1 according to the present embodiment is a nonaqueous electrolyte secondary battery. More specifically, the energy storage device 1 is a lithium ion secondary battery that utilizes electron transfer occurring in association with the transfer of lithium ions. The energy storage device 1 of this type can supply electronic energy. The energy storage device 1 may be used singly, or may be used in combination with another energy storage device or devices 1. More specifically, when both of the power to be required and the voltage to be required are small, the energy storage device 1 is used singly. On the other hand, when at least one of the power to be required and the voltage to be required is large, the energy storage device 1 is used in combination with another energy storage device or devices 1 and this combination of the energy storage devices 1 is used in an energy storage apparatus 100. In the electrical storage apparatus 100, the energy storage devices 1 used in the electrical storage apparatus 100 can supply electronic energy.

As shown in FIG. 1 to FIG. 5, the energy storage device 1 is provided with: an electrode assembly 2 equipped with a positive electrode 11 and a negative electrode 12; a case 3 in which the electrode assembly 2 is housed; and an external terminal 7 which is arranged outside of the case 3 and is electrically connected to the electrode assembly 2. In addition to the electrode assembly 2, the case 3 and the external terminal 7, the energy storage device 1 is also provided with a current collector member 5 which can electrically connect the electrode assembly 2 to the external terminal 7, and the like.

The electrode assembly 2 can be formed by winding a layered product 22 produced by laminating the positive electrode 11 and the negative electrode 12 which are insulated from each other by a separator 4.

The positive electrode 11 is provided with a metal film 111 (positive electrode substrate) and an active material layer 112 that is overlaid on a surface of the metal film 111 and contains an active material. In the present embodiment, the active material layers 112 are overlaid respectively on both surfaces of the metal film 111. The thickness of the positive electrode 11 is generally 40 μm to 150 μm inclusive.

The metal film 111 has a belt-like form. In the present embodiment, the metal film 111 in the positive electrode 11 is, for example, an aluminum film. In the positive electrode 11, an uncoated part 115 that is not coated with the positive active material layer 112 (i.e., a part on which the positive active material layer is not formed) is formed at one edge part of the positive electrode 11 as observed in the width direction (shorter-axis direction) of the belt-like form.

The positive active material layer 112 contains a particulate active material, a particulate conductive auxiliary agent and a binder. The thickness of (a single layer of) the positive active material layer 112 is generally 12 μm to 70 μm inclusive.

The active material of the positive electrode 11 is a compound capable of storing and releasing lithium ions. The particle size of the active material of the positive electrode 11 is generally 3 μm to 8 μm inclusive.

The active material of the positive electrode 11 is, for example, a lithium metal oxide. Specific examples of the active material of the positive electrode include: a composite oxide represented by $Li_pMeO_t$ (wherein Me represents at least one transition metal) (e.g., $Li_pCo_sO_2$, $Li_pNi_qO_2$, $Li_pMn_rO_4$, $Li_pNi_qCo_sMn_rO_2$); and a polyanion compound represented by $Li_pMe_u(XO_v)_w$ (wherein Me represents at least one transition metal, and X represents, for example, P, Si, B or V) (e.g., $Li_pFe_uPO_4$, $Li_pMn_uPO_4$, $Li_pMn_uSiO_4$, $Li_pCoPO_4F$).

In the present embodiment, the active material of the positive electrode 11 is a lithium metal composite oxide represented by the chemical formula: $Li_pNi_qMn_rCo_sO_t$ (wherein $0<p\leq1.3$, $q+r+s=1$, $0\leq q\leq1$, $0\leq r\leq1$, $0\leq s\leq1$, and $1.7\leq t\leq2.3$). It is also possible to satisfy the following requirements: $0<q<1$, $0<r<1$ and $0<s<1$.

Specific examples of the lithium metal composite oxide represented by the above-mentioned chemical formula: $Li_pNi_qMn_rCo_sO_t$ include $LiNi_{1/3}Co_{1/3}Mn_{1/3}O_2$, $LiNi_{1/6}Co_{1/6}Mn_{2/3}O_2$ and $LiCoO_2$.

Specific examples of the binder to be used in the positive active material layer 112 include poly(vinylidene fluoride) (PVdF), a copolymer of ethylene and vinyl alcohol, poly(methyl methacrylate), poly(ethylene oxide), poly(propylene oxide), poly(vinyl alcohol), poly(acrylic acid), poly(methacrylic acid) and styrene butadiene rubber (SBR). In the present embodiment, the binder is poly(vinylidene fluoride).

The conductive auxiliary agent to be used in the positive active material layer 112 is a carbonaceous material containing carbon in an amount of 98% by mass or more. Specific examples of the carbonaceous material include ketjen black (registered tradename), acetylene black and graphite. The positive active material layer 112 in the present embodiment contains acetylene black as the conductive auxiliary agent.

The negative electrode 12 includes a metal film 121 (negative electrode substrate) and a negative active material layer 122 formed on the metal film 121. In the present embodiment, the negative active material layers 122 are overlaid respectively on both surfaces of the metal film 121. The metal film 121 has a belt-like form. The metal film 121 to be used in the negative electrode of the present embodiment is, for example, a copper film. In the negative electrode 12, an uncoated part 125 that is not coated with the negative active material layer 122 (i.e., a part on which the negative active material layer is not formed) is formed at one edge part of the negative electrode 12 as observed in the width direction (shorter-axis direction) of the belt-like form. The thickness of the negative electrode 12 is generally 40 μm to 150 μm inclusive.

The negative active material layer 122 contains a particulate active material (active material particles) and a binder. The negative active material layer 122 is so arranged as to face the positive electrode 11 with a separator 4 interposed therebetween. The width of the negative active material layer 122 is larger than that of the positive active material layer 112.

The distribution curve of differential pore volume in the negative active material layer 122 has a peak appearing within the range from 0.1 μm to 2 μm inclusive, and the differential pore volume at the peak is 0.9 cm³/g or more. The differential pore volume at the peak is generally 1.8 cm³/g or less. The distribution curve may have a peak appearing within the range from 0.1 μm to 1 μm inclusive. In this regard, the total pore volume in the negative active material layer 122 is generally 0.28 cm³/g to 0.60 cm³/g inclusive.

The distribution curve of differential pore volume is determined by a mercury intrusion method. The mercury intrusion method can be carried out using a mercury intrusion porosimeter. Concretely, the mercury intrusion method is carried out in accordance with Japanese Industrial Standard (JIS R1655:2003). The distribution curve of differential pore volume can be obtained by expressing the results measured by a mercury intrusion method in "a logarithmic differential pore volume" in accordance with the above-mentioned standard. For example, the distribution curve of differential pore volume in the negative active material layer in each of the produced batteries can be determined in the following manner. Firstly, the battery is discharged, and then the battery is disassembled under a dried atmosphere. Subsequently, the active material layer is removed, is then washed with dimethyl carbonate, and is then dried under vacuo for two hours or longer. Subsequently, the distribution curve is determined by the measurement using a mercury intrusion porosimeter.

In the distribution curve of differential pore volume in the negative active material layer 122, the differential pore volume at a peak appearing within the range from 0.1 μm to 2 μm inclusive can be controlled by, for example, varying the solid content in a composite (composition) used for the formation of the negative active material layer 122. Concretely, the differential pore volume at the peak can be increased by reducing the solid content in the composite (composition). The solid content is preferably 70% by mass or less, more preferably 65% by mass or less. From the viewpoint of the improvement in handling of the composite (composition), the solid content is preferably 50% by mass or more. The differential pore volume at a peak appearing within the range from 0.1 μm to 2 μm inclusive can be controlled by varying the average particle size D50 of the active material particles. The average particle size D50 of the active material particles in the negative electrode 12 is preferably 1.0 μm or more, more preferably 2.0 μm or more. The average particle size D50 is also preferably 5.0 μm or less, more preferably 3.0 μm or less.

The active material of the negative electrode 12 can contribute to electrode reactions including a charge reaction and a discharge reaction in the negative electrode 12. The active material of the negative electrode 12 is amorphous carbon. The negative active material layer 122 contains at least one of hardly graphitizable carbon and easily graphitizable carbon. The active material of the negative electrode 12 according to the present embodiment is hardly graphitizable carbon. The term "amorphous carbon" as used herein refers to a carbon material of which the average interplanar distance d002 of (002) plane, which is measured by a wide-angle X-ray diffraction method using CuKα line as a radiation source in a discharged state, is 0.340 nm to 0.390 nm inclusive. The hardly graphitizable carbon has an average interplanar distance d002 of 0.360 nm to 0.390 nm inclusive.

The average particle size D50 of the active material of the negative electrode 12 is an average particle size (also referred to as a "median diameter") at which the volume cumulative frequency becomes 50% in a volume cumulative distribution which is drawn from a smaller diameter side in a particle size distribution of the particle size. The average particle size D50 can be determined by the measurement using a laser diffraction-scattering-type particle size measurement device. The conditions for the measurement will be described in detail in the section "EXAMPLES". In the measurement of the average particle size D50 of the active material of the produced battery, the battery is discharged and is then disassembled under a dry atmosphere, for example. Subsequently, the active material layer is removed, is then washed with dimethyl carbonate and is then crushed, and the crushed product is dried under vacuo for two hours or longer. Subsequently, the average size can be determined using a particle size distribution measurement device.

The thickness of (a single layer of) the negative active material layer 122 is generally 10 μm to 70 μm inclusive. The thickness may be 40 μm to 70 μm inclusive. The areal weight of (a single layer of the negative active material layer is generally 3 mg/cm$^2$ to 10 mg/cm$^2$ inclusive. The density of (a single layer of) the negative active material layer 122 is generally 0.6 g/cm$^3$ to 1.5 g/cm$^3$ inclusive. The above-mentioned thickness of (a single layer of) the negative active material layer 122 is an average of the thicknesses of at least five points that are selected randomly. The areal weight and the density (per a single layer) of the negative active material layer 122 are those of a single layer of the negative active material layer 122 which is so arranged as to cover one surface of the metal film 121. The density of the negative active material layer 122 can be determined by cutting the negative electrode 12 into a predetermined size, then measuring the mass and the thickness of the negative electrode 12, then delaminating the negative active material layer 122 from the metal film 121, then measuring the mass and the thickness of the metal film 121, and then subtracting the mass and the thickness of the metal film 121 from the mass and the thickness of the negative electrode 12, respectively.

The binder to be used in the negative active material layer is the same as that to be used in the positive active material layer. The binder used in the present embodiment is styrene butadiene rubber (SBR).

In the negative active material layer 122, the content ratio of the binder may be 5% by mass to 10% by mass inclusive relative to the total mass of the active material of the negative electrode and the binder.

The negative active material layer 122 further contains a cellulose derivative in addition to the active material particles and the binder. The cellulose derivative is a compound in which some of hydroxy groups in cellulose react with a compound having a hydrophilic group. The negative active material layer 122 generally contains the cellulose derivative in an amount of 0.3 to 2.0% by mass.

Specific examples of the cellulose derivative include carboxy methyl cellulose (including salts thereof), hydroxy ethyl cellulose and hydroxy propyl methyl cellulose. The cellulose derivative used in the present embodiment is carboxy methyl cellulose. The carboxy methyl cellulose may be in the form of a salt.

The negative active material layer 122 may additionally contain a conductive auxiliary agent such as ketjen black (registered tradename), acetylene black and graphite. The negative active material layer 122 in the present embodiment contains no conductive auxiliary agent.

In the electrode assembly 2 in the present embodiment, the positive electrode 11 and the negative electrode 12 which are configured as mentioned above are wound while being insulated from each other by a separator 4. Namely, in the electrode assembly 2 in the present embodiment, a layered product 22 composed of the positive electrode 11, the negative electrode 12 and the separator 4 is wound. The separator 4 is a member having insulation characteristics. The separator 4 is arranged between the positive electrode 11 and the negative electrode 12. Accordingly, in an electrode assembly 2 (more specifically, a layered product 22), the positive electrode 11 and the negative electrode 12 are insulated from each other. In a case 3, the separator 4 can carry the electrolyte solution therein. Accordingly, lithium ions can transfer between the positive electrode 11 and the negative electrode 12, which are laminated alternately with the separator 4 interposed therebetween, during the charging and discharging of the energy storage device 1.

The separator 4 has a belt-like form. The separator 4 is provided with a porous separator substrate. The separator 4 in the present embodiment is provided with only a separator substrate. The separator 4 is arranged between the positive electrode 11 and the negative electrode 12 for the purpose of preventing the short circuit between the positive electrode 11 and the negative electrode 12.

The separator substrate is porous. The separator substrate is, for example, a woven cloth, a non-woven cloth or a porous film. Examples of the material for the separator substrate include a polymeric compound, a glass and a ceramic. Specific examples of the polymeric compound include: a polyester such as polyacrylonitrile (PAN), polyamide (PA) and poly(ethylene terephthalate) (PET); a polyolefin (PO) such as polypropylene (PP) and polyethylene (PE); and cellulose.

Figure 4:
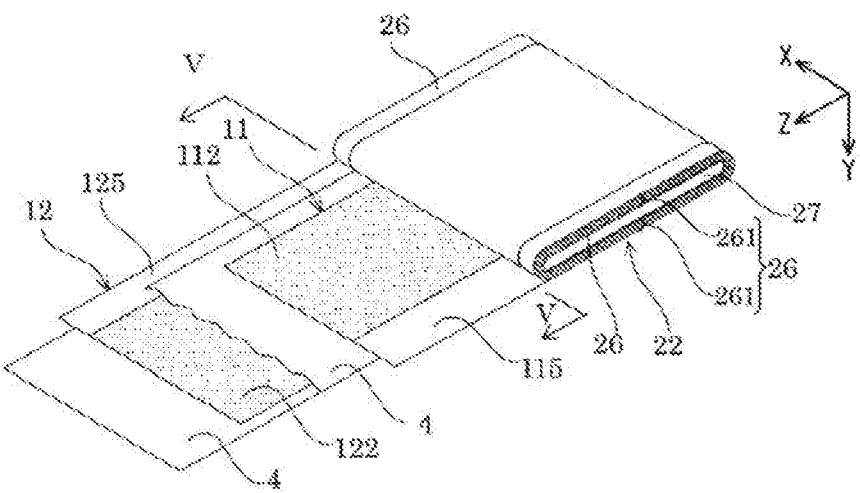
FIG. 4 is a drawing illustrating the configuration of an electrode assembly in the energy storage device according to the embodiment.
Figure 5:
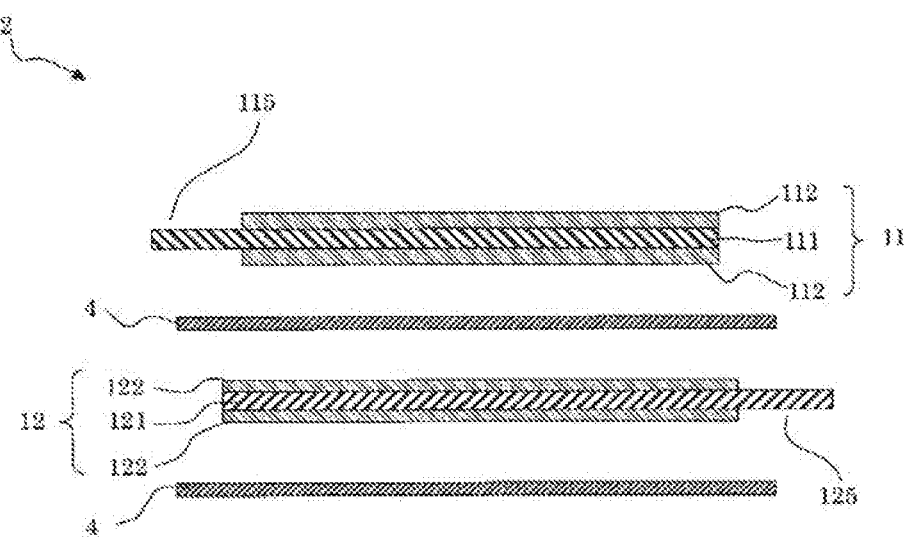
FIG. 5 is a cross-sectional view of a positive electrode, a negative electrode and a separator overlaid on one another (i.e., a cross-sectional view taken along line V-V in FIG. 4).

The width (i.e., the size of the belt-like form as observed in the shorter-axis direction) of the separator 4 is slightly larger than that of the negative active material layer 122. The separator 4 is arranged between the positive electrode 11 and the negative electrode 12 which are overlaid on each other in such a manner that the positive electrode 11 and the negative electrode 12 are misaligned with each other in the width direction so that the positive active material layer 112 can be overlaid on the negative active material layer 122. In this case, as shown in FIG. 4, an uncoated part 115 in the positive electrode 11 is not overlaid on an uncoated part 125 in the negative electrode 12. Namely, the uncoated part 115 in the positive electrode 11 projects in the width direction from a region where the positive electrode 11 and the negative electrode 12 are overlaid on each other, and the uncoated part 125 in the negative electrode 12 projects in the width direction (which is the direction opposite to the projecting direction of the uncoated part 115 in the positive electrode 11) from a region where the positive electrode 11 and the negative electrode 12 are overlaid on each other. The positive electrode 11, the negative electrode 12 and the separator 4 which are in a laminated state, i.e., a laminated product 22, are wound to form the electrode assembly 2. An uncoated laminated part 26 in the electrode assembly 2 is formed by a part where only the uncoated part 115 in the positive electrode 11 or the uncoated part 125 in the negative electrode 12 is laminated.

The uncoated laminated part 26 is a part which is electrically communicated with the current collector 5 in the electrode assembly 2. The uncoated laminated part 26 is divided into two parts (dual-partitioned uncoated laminated parts) 261 with a hollow part 27 (see FIG. 4) interposed therebetween as observed in the direction toward the center of the winding of the positive electrode 11, the negative electrode 12 and the separator 4.

The uncoated laminated part 26 configured as mentioned above is provided at each electrode in the electrode assembly 2. Namely the uncoated laminated part 26 where only the uncoated part 115 in the positive electrode 11 is laminated constitutes an uncoated laminated part of the positive electrode 11 in the electrode assembly 2, and the uncoated laminated part 26 where only the uncoated part 125 in the negative electrode 12 is laminated constitutes an uncoated laminated part of the negative electrode 12 in the electrode assembly 2.

The case 3 is provided with a case main body 31 having an opening and a lid plate 32 that can close the opening in the case main body 31. In the case 3, the electrolyte solution is enclosed in an inner space of the case 3 together with the electrode assembly 2, the current collector 5 and the like. The case 3 is made from a metal having resistance to electrolyte solutions. The case 3 is made from, for example, aluminum or an aluminum-based metallic material such as an aluminum alloy. The case 3 may also be made from a metallic material such as stainless steel and nickel, or a composite material produced by adhering a resin such as nylon onto aluminum, or the like.

The electrolyte solution is a nonaqueous solution-based electrolyte solution. The electrolyte solution can be prepared by dissolving an electrolyte salt in an organic solvent. Specific examples of the organic solvent include: a cyclic carbonic acid ester such as propylene carbonate and ethylene carbonate; and a linear carbonate such as dimethyl carbonate, diethyl carbonate and ethyl methyl carbonate. Specific examples of the electrolyte salt include $LiClO_4$, $LiBF_4$ and $LiPF_6$. The electrolyte solution in the present embodiment is one prepared by dissolving 0.5 to 1.5 mol/L of $LiPF_6$ in a mixed solvent prepared by mixing propylene carbonate, dimethyl carbonate and ethyl methyl carbonate at a specified mixing ratio.

The case 3 is formed by bonding the periphery of the opening of the case main body 31 to the periphery of the rectangular lid plate 32 while overlaying both of the peripheries on each other. The case 3 has an inner space demarcated by the case main body 31 and the lid plate 32. In the present embodiment, the periphery of the opening of the case main body 31 and the periphery of the rectangular lid plate 32 are bonded to each other by welding.

In the following explanation, as shown in FIG. 1, the longer side direction of the lid plate 32 is defined as the X-axis direction, the shorter size direction of the lid plate 32 is defined as the Y-axis direction, and the normal direction of the lid plate 32 is defined as the Z-axis direction. The case main body 31 has an angular cylindrical shape in which one edge is closed when observed in the opening direction (the Z-axis direction) (i.e., a bottomed angular cylindrical shape). The lid plate 32 is a plate-like member that closes the opening of the case main body 31.

The lid plate 32 is provided with a gas release valve 321 through which a gas in the case 3 can be released to the outside. The gas release valve 321 is so configured that the gas can be released from the case 3 to the outside when the internal pressure in the case 3 increases to a predetermined pressure. The gas release valve 321 is arranged at a center part of the lid plate 32 as observed in the X-axis direction.

In the case 3, there is provided an electrolyte solution filling hole through which the electrolyte solution can be injected. The electrolyte solution filling hole allows the communication between the inside and the outside of the case 3. The electrolyte solution filling hole is formed in the lid plate 32. The electrolyte solution filling hole can be hermetically sealed (closed) with the electrolyte solution filling plug 326. The electrolyte solution filling plug 326 is fixed to the case 3 (or the lid plate 32 in the example shown in the present embodiment) by welding.

The external terminal 7 is a part which is electrically connected to an external terminal 7 of another energy storage device 1, an external apparatus or the like. The external terminal 7 is formed by a member having electrical conductivity. For example, the external terminal 7 is formed by a metallic material having high weldability, such as an aluminum-based metallic material such as aluminum and an aluminum alloy and a copper-based metallic material such as copper and a copper alloy.

The external terminal 7 has a surface 71 to which a bus bar or the like can be welded. The surface 71 is flat. The external terminal 7 has a plate-like form that extends along the lid plate 32. More specifically, the external terminal 7 has a rectangular plate-like form as observed in the Z-axis direction.

The current collector 5 is arranged in the case 3 and is directly or indirectly connected to the electrode assembly 2 in an electrically conducive manner. The current collector 5 in the present embodiment is connected to the electrode assembly 2 in an electrically conductive manner through a clip member 50. Namely, the energy storage device 1 is provided with a clip member 50 which can connect the electrode assembly 2 to the current collector 5 in an electrically conductive manner.

Figure 2:
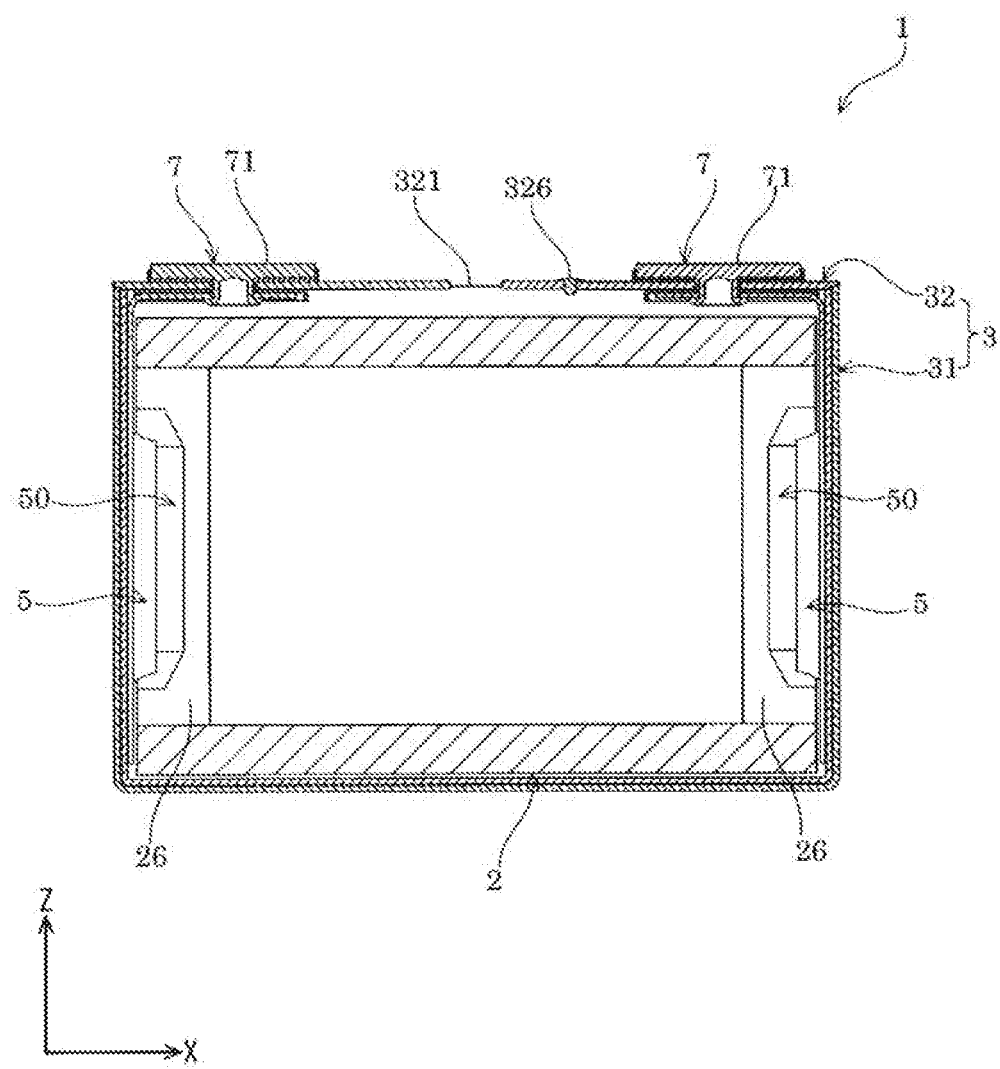
FIG. 2 is a cross-sectional view taken along line II-II in FIG. 1.
Figure 3:
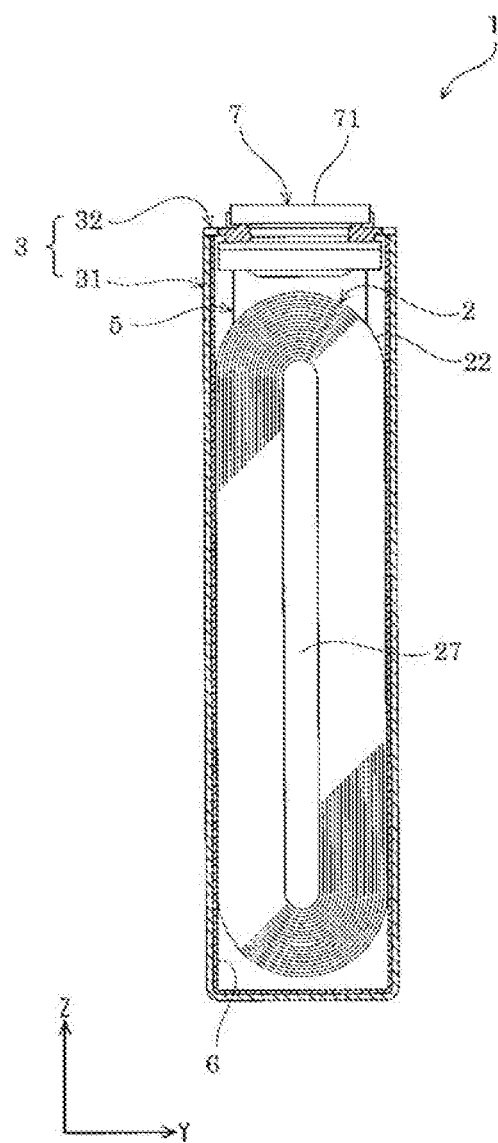
FIG. 3 is a cross-sectional view taken along line III-III in FIG. 1.

The current collector 5 is formed by a member having electrical conductivity. As shown in FIG. 2, the current collector 5 is arranged along the inner surface of the case 3. The current collector 5 is arranged in each of the positive electrode 11 and the negative electrode 12 in the energy storage device 1. In the energy storage device 1 according to the present embodiment, the current collector 5 is arranged in each of the uncoated laminated part 26 of the positive electrode 11 and the uncoated laminated part 26 of the negative electrode 12 in the electrode assembly 2 in the case 3.

The current collector 5 in the positive electrode 11 and the current collector 5 in the negative electrode 12 are made from different materials from each other. More specifically, the current collector 5 in the positive electrode 11 is made from, for example, aluminum or an aluminum alloy, while the current collector 5 in the negative electrode 12 is made from, for example, copper or a copper alloy.

In the energy storage device 1 according to the present embodiment, an electrode assembly 2 (more concretely an electrode assembly 2 and a current collector 5) which is enclosed in a bag-shaped insulating cover 6 capable of insulating the electrode assembly 2 and a case 3 from each other is housed in the case 3.

Next, the method for producing the energy storage device 1 according to the above-mentioned embodiment will be described.

For example, in the method for producing the energy storage device 1, firstly a composite containing an active material is applied onto a metal film (electrode substrate) to form an active material layer. In this manner, a positive electrode 11 and a negative electrode 12 are formed. Subsequently, the positive electrode 11, a separator 4 and the negative electrode 12 are laminated together to form an electrode assembly 2. Subsequently, the electrode assembly 2 is housed in a case 3 and then an electrolyte solution is injected into the case 3 to assemble the energy storage device 1.

In the production of the positive electrode 11, a composite containing an active material, a binder, a conductive auxiliary agent and a solvent is applied on both surfaces of the metal film to form positive active material layers 112. As the application method for forming the positive active material layers 112, a conventional method may be employed. Each of the applied positive active material layers 112 is roll-pressed under a predetermined pressure.

In the production of the negative electrode 12, a composite containing an active material, a binder, water that serves as a solvent, and carboxy methyl cellulose that serves as a thickening agent is applied onto both surfaces of the metal film to form negative active material layers 122. By increasing the amount of the solvent in the composite, in other words, by reducing the solid content, it becomes possible to increase the differential pore volume of a peak that appears in the range from 0.1 µm to 2 µm inclusive in a distribution curve of differential pore volume in the negative active material layer 122. The solid content is preferably 70% by mass or less, more preferably 65% by mass or less. From the viewpoint of the improvement in handling of the composite (composition), the solid content is preferably 50% by mass or more. As the application method for forming the negative active material layer 122, a conventional method can be employed. Each of the applied negative active material layers 122 is roll-pressed under a predetermined pressure. By controlling the pressing pressure, it becomes possible to control the thickness or density of the negative active material layers 122. By decreasing the pressing pressure, it becomes possible to increase the differential pore volume of a peak that appears in the range from 0.1 µm to 2 µm inclusive in a distribution curve of differential pore volume in the negative active material layer 122. The pressing pressure is preferably 20 kgf/mm or less, more preferably 15 kgf/mm or less.

In the formation of the electrode assembly 2, a layered product 22 in which the separator 4 is sandwiched between the positive electrode 11 and the negative electrode 12 is wound to form the electrode assembly 2. More specifically, the positive electrode 11, the separator 4 and the negative electrode 12 are laminated together in such a manner that the positive active material layer 112 can face the negative active material layer 122 with the separator 4 interposed therebetween to form the layered product 22. Subsequently, the layered product 22 is wound to form the electrode assembly 2.

In the assembling of the energy storage device 1, the electrode assembly 2 is housed in the case main body 31 of the case 3, the opening of the case main body 31 is closed with the lid plate 32, and then an electrolyte solution is injected into the case 3. In the closing of the opening of the case main body 31 with the lid plate 32, the electrode assembly 2 is housed in the inside of the case main body 31, and then the opening of the case main body 31 is closed with the lid plate 32 while electrically connecting the positive electrode 11 to one of the external terminals 7 and electrically connecting the negative electrode 12 to the other of the external terminals 7. In the injection of the electrolyte solution into the case 3, the electrolyte solution is injected into the case 3 through an injection hole formed in the lid plate 32 in the case 3.

The energy storage device 1 according to the present embodiment which is configured as mentioned above is provided with a negative active material layer 122 containing particulate amorphous carbon, wherein the distribution curve of differential pore volume in the negative active material layer 122 has a peak appearing within the range from 0.1 µm to 2 µm inclusive, and the differential pore volume at the peak is 0.9 cm$^3$/g or more. Due to this configuration, the power performance at a relatively large current can be improved. More concretely, a pore size of 0.1 µm to 2 µm inclusive is enough for the electrolyte solution to be diffused therein, and sufficient conductive paths are formed between particles of amorphous carbon (active material particles) which form the pores each having the pore size falling within the above-mentioned range. Therefore, even at a relatively large current, the conductive paths can contribute to the improvement in power performance.

In the energy storage device 1, because amorphous carbon that undergoes relatively small expansion/shrinkage upon charge/discharge is contained in the negative active material layer, the deformation or the like of the negative active material layer rarely occurs before and after charge/discharge and the pore structures in the active material layer are rarely altered. Accordingly, the pore structures at the initial stage of charge/discharge greatly contribute to power characteristics. Furthermore, the setting of the differential pore volume distribution curve to the above-mentioned numerical range has such significant effect that the power performance at a large current can be particularly improved. On the other hand, in the case where graphite or a silicon compound which undergoes relatively large expansion/shrinkage upon charge/discharge is contained in the negative active material, the deformation or the like of the negative active material layer frequently occurs before and after charge/discharge and the pore structures in the active material layer are frequently altered. Therefore, the degree of the contribution of the pore structures at the initial stage of charge/discharge to the power characteristics is reduced, and it is considered that the power performance can be improved in a numerical range for the differential pore volume distribution curve which is different from the above-mentioned numerical range.

In the energy storage device 1, the thickness of (a single layer of) the negative active material layer 122 may be 40 µm to 70 µm inclusive. If the thickness is as relatively large as mentioned above, it may become difficult to sufficiently supply an electrolyte solution to pores in the negative active material layer 122. However, when the differential pore volume of a specific peak is 0.9 cm$^3$/g or more, an electrolyte solution can be supplied sufficiently to the inside of the layer even when the negative active material layer 122 is relatively thick. As a result, the power performance at a relatively large current can be improved.

The energy storage device of the present invention is not limited to the above-mentioned embodiment and, as a matter of course, various modification may be made within the scope without departing from the concept of the invention. For example, the configuration of one embodiment can be added to the configuration of another embodiment, and a part of the configuration of one embodiment can be substituted by a part of the configuration of another embodiment. Alternatively, a part of the configuration of an embodiment can be eliminated.

In the above-mentioned embodiment, a positive electrode in which an active material layer containing an active material is in directly contact with a metal film is described in detail. In the present invention, however, the positive electrode may have a conductive layer containing a binder and a conductive auxiliary agent and arranged between the active material layer and the metal film.

In the above-mentioned embodiment, an electrode in which active material layers are arranged respectively on both surfaces of a metal film in each of electrodes is described. In the energy storage device according to the present invention, however, the positive electrode 11 or the negative electrode 12 may have an active material layer only on one surface of the metal film.

In the above-mentioned embodiment, an energy storage device 1 provided with an electrode assembly 2 in which a layered product 22 is wound is described in detail. However, the energy storage device of the present invention may be provided with an unwound layered product 22. More specifically, the energy storage device may be provided with an electrode assembly in which a positive electrode, a separator, a negative electrode and a separator each formed in a rectangular shape are laminated in this order multiple times.

In the above-mentioned embodiment, a case where the energy storage device 1 is used as a chargeable-dischargeable nonaqueous electrolyte secondary battery (e.g., a lithium ion secondary battery) is described. However, the type or size (capacity) of the energy storage device 1 may be any one. In the above-mentioned embodiment, a lithium ion secondary battery is described as one example of the energy storage device 1. However, the energy storage device 1 is not limited to the lithium ion secondary battery. For example, the present invention can be applied to various secondary batteries, primary batteries, and energy storage devices for capacitors such as electric double layer capacitors.

Figure 6:
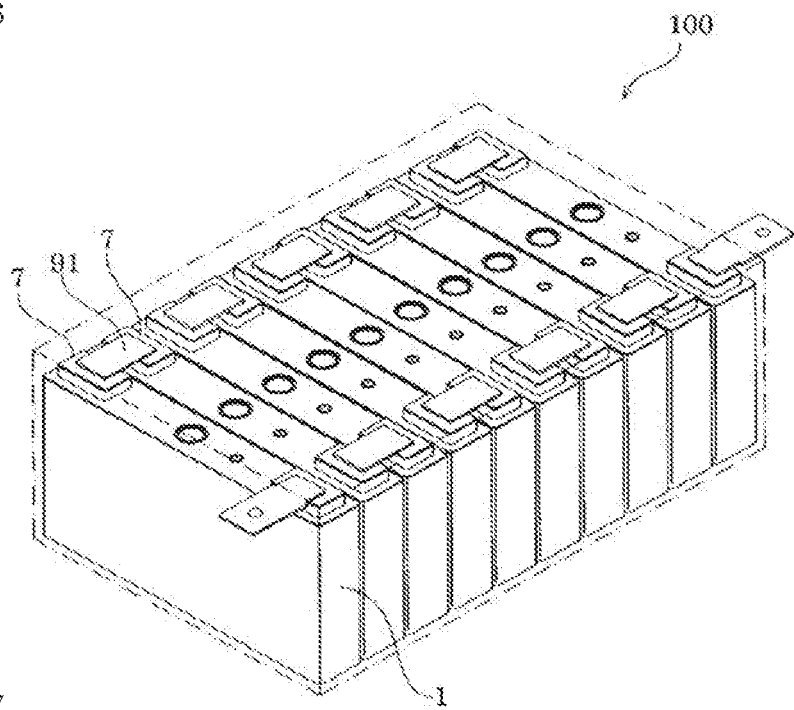
FIG. 6 is a perspective view of an energy storage apparatus provided with the energy storage device according to the embodiment.

The energy storage device 1 (e.g., a battery) may be used in an electrical storage apparatus 100 (e.g., a battery module in the case where the energy storage device is a battery) as shown in FIG. 6. The electrical storage apparatus 100 is provided with at least two energy storage devices 1 and a bus bar member 91 for electrically connecting the two (different) energy storage devices 1 to each other. In this case, the technique of the present invention may be applied to at least one of the energy storage devices.

EXAMPLES

A nonaqueous electrolyte secondary battery (lithium ion secondary battery) was produced in the following manner.

Test Example 1

(1) Production of Positive Electrode

N-Methyl-2-pyrrolidone (NMP) that served as a solvent, a conductive auxiliary agent (acetylene black), a binder (PVdF) and a particulate active material ($LiNi_{1/3}Co_{1/3}Mn_{1/3}O_2$) were mixed and kneaded to prepare a composite for a positive electrode. The amounts of the conductive auxiliary agent, the binder and the active material were 4.5% by mass, 4.5% by mass and 91% by mass, respectively. The composite for a positive electrode was applied on both surfaces of an aluminum film (15 μm thick). After drying the composite, the composite was roll-pressed. Subsequently, the roll-pressed product was dried under vacuo to remove water and the like. The thickness of an active material layer (per a single layer) was 32 μm.

(2) Production of Negative Electrode

As an active material, particulate amorphous carbon (hardly graphitizable carbon) was used. As a binder, styrene butadiene rubber was used. As a thickening agent, a cellulose derivative (carboxy methyl cellulose Na salt [product name "2200" manufactured by Daicel]) was used. A composite for a negative electrode was prepared by mixing and kneading water that served as a solvent, the binder, the cellulose derivative and the active material together. The cellulose derivative was added in an amount of 1.0% by mass, the binder is added in an amount of 2.0% by mass, and the active material was added in an amount of 97.0% by mass. The composite for a negative electrode thus prepared was applied on both surfaces of a copper film (10 μm thick) in such a manner that the applied amount (areal weight) of the composite after drying became 3.8 mg/cm$^2$. After drying the composite, the dried product was dried under vacuo to remove water and the like. The negative electrode was not subjected to roll-pressing. The thickness of the active material layer (per a single layer) was 54 μm. The density of the active material layer was 0.704 g/cm$^3$. The density of the active material layer was determined by cutting the negative electrode into a predetermined size, then measuring the mass and the thickness of the negative electrode, then delaminating the active material layer from the metal film, then measuring the mass and the thickness of the metal film, and then subtracting the mass and the thickness of the metal film from the mass and the thickness of the negative electrode, respectively.

(3) Separator

As a separator, a polyethylene-made microporous film having a thickness of 22 μm was used. The polyethylene-made microporous film had air resistance of 100 sec/100 cc.

(4) Preparation of Electrolyte Solution

As an electrolyte solution, one prepared in the following manner was used. A solvent prepared by mixing one part by volume of propylene carbonate, one part by volume of dimethyl carbonate and one part by volume of ethyl methyl carbonate together was used as a nonaqueous solvent, and then $LiPF_6$ was dissolved in the nonaqueous solvent so that the salt concentration became 1 mol/L to prepare the electrolyte solution.

(5) Arrangement of Electrode Assembly in Case

A battery was produced by a conventional method using the positive electrode, the negative electrode, the electrolyte solution, the separator and a case.

Firstly, a sheet-like article in which the positive electrode and the negative electrode were laminated on each other with the separator interposed therebetween was wound. Subsequently the wound electrode assembly was placed in a case main body of an aluminum-made prismatic container can which served as the case. Subsequently, the positive electrode and the negative electrode were electrically connected to two external terminals, respectively. A lid plate was attached to the case main body. The electrolyte solution was injected into the case through an electrolyte solution filling port formed in the lid plate in the case. Finally, the electrolyte solution filling port in the case was sealed to hermetically seal the case.

Average Particle Size D50 of Negative Active Material

The negative electrode active material layer was removed from the produced battery. The active material layer was washed with dimethyl carbonate, was then crushed, and was then subjected to a pretreatment, i.e., drying under vacuo, for two hours or longer. A laser diffraction-mode particle size distribution measurement device ("SALD2200" manufactured by Shimadzu Corporation) was used as a measurement device, and a specialized application software DMS ver.2 was used as a measurement control software. As a concrete measurement procedure, a scattering measurement mode was employed, then a wet-mode cell in which a dispersion having a measurement sample (active material) dispersed therein was circulating was placed under an ultrasonic environment for two minutes, and then the cell was irradiated with a laser beam to obtain a scattered light distribution from the measurement sample. The scattered light distribution was approximated by a log-normal distribution. The particle size corresponding to a cumulation degree of 50% (D50) within a range in which the smallest value was set to 0.021 µm and the largest value was set to 2000 µm in the particle size distribution (transverse axis, a) was defined as an average particle size. The dispersion contained a surfactant and also contained SN dispersant 7347-C (product name) or Triton X-100 (product name) as a dispersant. Some droplets of the dispersant were added to the dispersion.

µm to 2 µm inclusive had each of the values shown in Tables 1 and 2, and that negative electrode active material particles respectively having average particle sizes shown in Tables 1 and 2 were used. In this manner, lithium ion secondary batteries were produced.

Reference Example

The same procedure as in Test Example 1 was carried out, except that negative active material particles (graphite) having an average particle size of 9.0 µm were used and the solid content in the composite was varied (64% by mass, 61% by mass, 60% by mass, 55% by mass). In this manner, it was tried to produce lithium ion secondary batteries. However, it was impossible to produce a battery having a differential pore volume of a peak appearing within the range from 0.1 µm to 2 µm inclusive was 0.9 cm$^3$/g or more.

TABLE 1

| | Average particle size of hardly graphitizable carbon | Solid content in composite [% by mass] | Differential pore volume of peak appearing at 0.1 to 2 µm [cm$^3$/g] | Assist power at 25° C., 55% and 10 sec./% [value relative to Test Example 4] |
|---|---|---|---|---|
| Test Example 1 | 2.7 µm | 71% | 0.849 | 91.9 |
| Test Example 2 | 2.7 µm | 70% | 0.950 | 98.7 |
| Test Example 3 | 2.7 µm | 69% | 1.100 | 99.8 |
| Test Example 4 | 2.7 µm | 68% | 1.179 | 100.0 |
| Test Example 5 | 2.7 µm | 65% | 1.204 | 100.5 |
| Test Example 6 | 2.7 µm | 62% | 1.243 | 100.7 |
| Test Example 7 | 2.7 µm | 59% | 1.301 | 100.5 |
| Test Example 8 | 2.7 µm | 53% | 1.237 | 101.6 |

TABLE 2

| | Average particle size of hardly graphitizable carbon | Solid content in composite [% by mass] | Differential pore volume of peak appearing at 0.1 to 2 µm [cm$^3$/g] | Assist power at 25° C., 55% and 10 sec./% [value relative to Test Example 4] |
|---|---|---|---|---|
| Test Example 9 | 4.2 µm | 71% | 0.880 | 90.7 |
| Test Example 10 | 4.2 µm | 68% | 1.180 | 100.0 |
| Test Example 11 | 4.2 µm | 63% | 1.507 | 101.1 |

Distribution Curve of Differential Pore Volume in Negative Active Material Layer The negative electrode active material layer was removed from the produced battery. The active material layer was washed with dimethyl carbonate, and was then subjected to a pretreatment, i.e., drying under vacuo, for two hours or longer. Mercury intrusion porosimeter ("AutoPore9405" manufactured by Micromeritics) was used as a measurement device. The distribution of pores in the negative active material layer was measured by a mercury intrusion method using the device. Concretely in the mercury intrusion method, the measurement conditions in accordance with JIS R 1655 were employed. The differential pore volume in the range from 0.1 µm to 2 µm inclusive in the distribution curve of the differential pore volume in the negative active material layer was determined with a software included to the measurement device.

Test Examples 2 to 11

The same procedure as in Test Example 1 was carried out, except that the solid content in a composite for a negative electrode was varied in such a manner that the differential pore volume of a peak appearing within the range from 0.1

<Evaluation of Assist Power Performance>

A current capacity IC (A) was determined by discharging each of the batteries at 25° C. and 4A, wherein the upper limit and the lower limit of the discharge were 4.1 V and 2.4 V respectively. Subsequently, each of the batteries was charged from the discharged state at 25° C. and 0.5 C (A) for 1.1 hours. In this manner, batteries each having a SOC of 55% were prepared. Each of the batteries thus prepared was discharged continuously at 25° C. and 20 C, and a voltage value and a current value 10 seconds after the start of the discharge were measured. The voltage value was multiplied by the current value to calculate the power value of each of the batteries.

Figure 7:
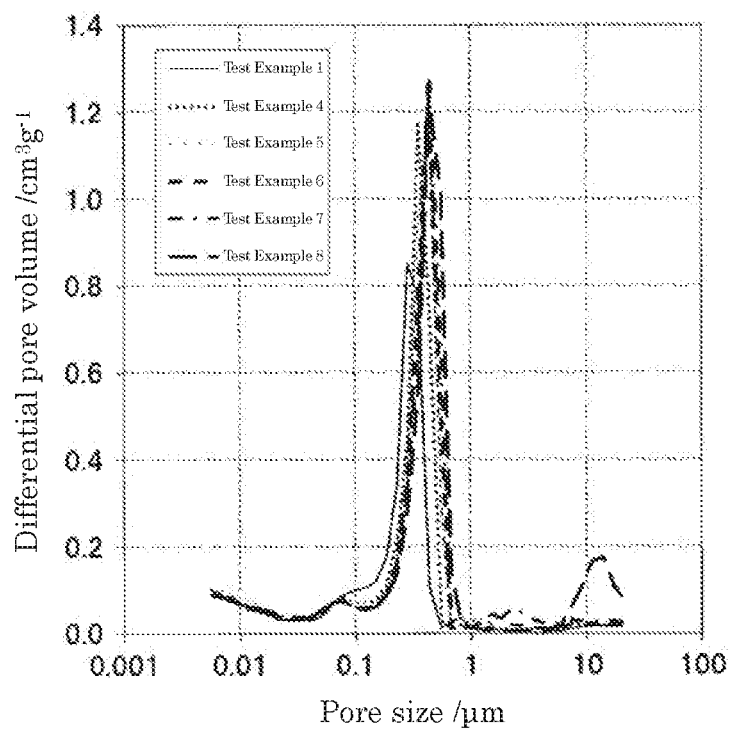
FIG. 7 is a graph illustrating a distribution curve of differential pore volume in a negative active material layer.
Figure 8:
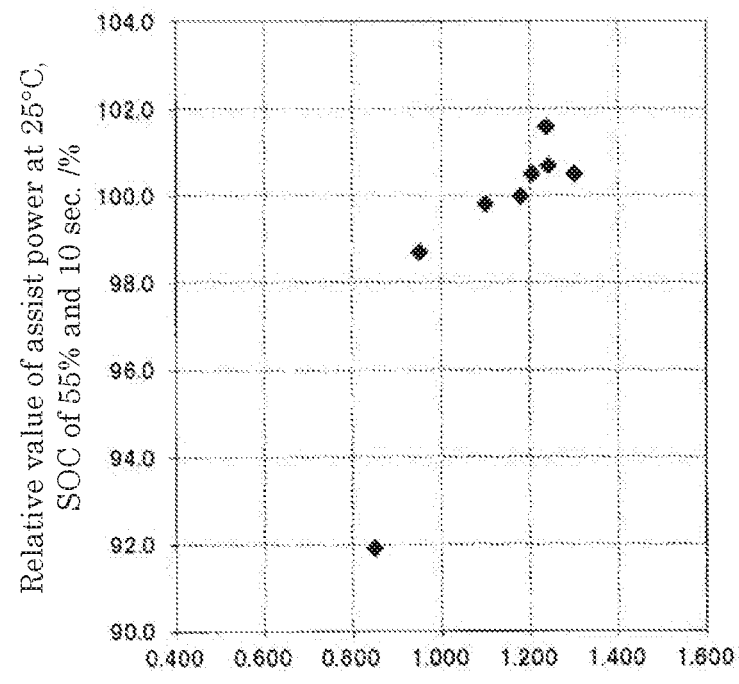
FIG. 8 is a graph illustrating the results of the evaluation of power performance.
Figure 9:
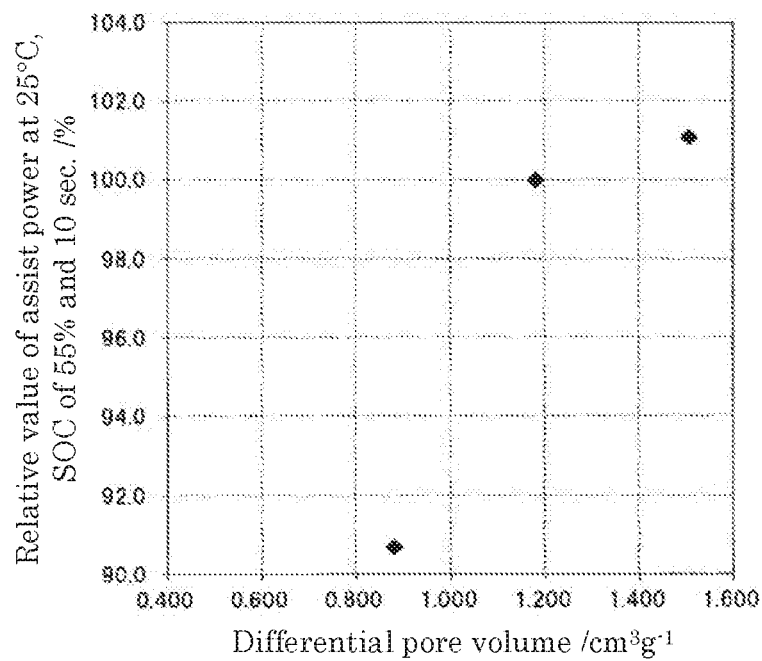
FIG. 9 is a graph illustrating the results of the evaluation of power performance.

Examples of the distribution curve of differential pore volume in each of the test examples are shown in FIG. 7. The evaluation results shown in Table 1 are shown in a graph in FIG. 8. The evaluation results shown in Table 2 are shown in a graph in FIG. 9.

Batteries in each of which the distribution curve of differential pore volume in the negative active material layer had a peak appearing within the range from 0.1 µm to 2 µm inclusive and the differential pore volume at the peak was 0.9 cm³/g or more had sufficient power performance even at relatively large currents.

DESCRIPTION OF REFERENCE SIGNS

1: energy storage device (nonaqueous electrolyte secondary battery),
2: electrode assembly
26: uncoated laminated part
3: case, 31: case main body, 32: lid plate
4: separator,
5: current collector, 50: clip member,
6: insulating cover,
7: external terminal, 71: surface
11: positive electrode, 111: positive electrode metal film (positive electrode substrate), 112: positive active material layer
12: negative electrode, 121: negative electrode metal film (negative electrode substrate), 122: negative active material layer
91: bus bar member
100: energy storage apparatus

The invention claimed is:

1. An energy storage device which has a negative active material layer containing particulate amorphous carbon, wherein an average particle size D50 of the amorphous carbon is 1.0 μm or more and 3.0 μm or less, and
a distribution curve of differential pore volume in the negative active material layer has a peak appearing within a range from 0.1 μm to 2 μm inclusive and the differential pore volume at the peak is 0.9 cm³/g or more and 1.301 cm³/g or less.

2. A method for producing the energy storage device according to claim 1,
wherein:
a negative electrode is produced by applying a negative electrode paste prepared by mixing the particulate amorphous carbon, a binder and a thickening agent with a solvent onto a current collector and then drying the negative electrode paste; and
a solid content in the negative electrode paste is 70% or less.

3. The energy storage device according to claim 1, wherein a thickness of a single layer of the negative active material layer is 40 μm to 70 μm inclusive,
an areal weight of the single layer of the negative active material layer is 3 mg/cm² to 10 mg/cm² inclusive, and
a density of the negative active material layer is 0.6 g/cm³ to 1.5 g/cm³ inclusive.

* * * * *